(12) United States Patent
Misiak et al.

(10) Patent No.: US 11,965,119 B2
(45) Date of Patent: Apr. 23, 2024

(54) SULFONE-RESIN CONTAINING GAS-BARRIER ADHESIVE

(71) Applicant: Henkel AG & Co. KGaA, Duesseldorf (DE)

(72) Inventors: Hanns Misiak, Haan (DE); Daniela Neitzke, Duesseldorf (DE); Christina Huebner, Winistorf (CH); Ligang Zhao, Duesseldorf (DE); Hans-Georg Kinzelmann, Pulheim (DE); Vanessa Alexandra Picon Miranda, Neuss (DE)

(73) Assignee: HENKEL AG & CO. KGaA, Duesseldorf (DE)

( * ) Notice: Subject to any disclaimer, the term of this patent is extended or adjusted under 35 U.S.C. 154(b) by 19 days.

(21) Appl. No.: 17/460,684

(22) Filed: Aug. 30, 2021

(65) Prior Publication Data
US 2021/0388246 A1   Dec. 16, 2021

Related U.S. Application Data

(63) Continuation of application No. PCT/EP2020/056597, filed on Mar. 12, 2020.

(30) Foreign Application Priority Data

Mar. 15, 2019 (EP) .................................. 19163228

(51) Int. Cl.
| | | |
|---|---|---|
| C09J 181/06 | (2006.01) | |
| B32B 7/12 | (2006.01) | |
| B32B 27/32 | (2006.01) | |
| B32B 27/36 | (2006.01) | |
| B32B 37/12 | (2006.01) | |
| B32B 37/18 | (2006.01) | |
| C08G 75/20 | (2016.01) | |
| C09J 5/00 | (2006.01) | |

(52) U.S. Cl.
CPC .............. *C09J 181/06* (2013.01); *B32B 7/12* (2013.01); *B32B 27/32* (2013.01); *B32B 27/36* (2013.01); *B32B 37/12* (2013.01); *B32B 37/182* (2013.01); *C08G 75/20* (2013.01); *C09J 5/00* (2013.01); *B32B 2250/02* (2013.01); *B32B 2250/24* (2013.01); *B32B 2255/10* (2013.01); *B32B 2255/26* (2013.01); *B32B 2307/7244* (2013.01); *B32B 2323/10* (2013.01); *B32B 2367/00* (2013.01); *B32B 2439/70* (2013.01); *B32B 2439/80* (2013.01); *C09J 2481/00* (2013.01)

(58) Field of Classification Search
CPC ........ C09J 181/06; C09J 5/00; C09J 2481/00; B32B 2439/80; B32B 7/12; B32B 37/12; B32B 37/182; B32B 27/32; B32B 27/36; B32B 2250/02; B32B 2250/24; B32B 2255/26; B32B 2255/10; B32B 2307/7244; B32B 2323/10; B32B 2367/00; B32B 2439/70; B65D 65/40; C08G 75/20
USPC ....................................................... 524/609
See application file for complete search history.

(56) References Cited

U.S. PATENT DOCUMENTS

| | | |
|---|---|---|
| 3,398,211 A | 8/1968 | Ramos |
| 4,500,582 A | 2/1985 | King et al. |
| 4,593,056 A | 6/1986 | Qureshi et al. |
| 6,982,119 B2 | 1/2006 | Shi et al. |
| 7,425,598 B2 | 9/2008 | Kutsuna et al. |
| 9,200,179 B2 | 12/2015 | Uchida |
| 9,303,116 B2 | 4/2016 | Kumamoto et al. |
| 2001/0012868 A1 | 8/2001 | Chen et al. |
| 2012/0024641 A1 | 2/2012 | Ito et al. |
| 2012/0123039 A1* | 5/2012 | Shieh ................... C08G 59/066 524/451 |
| 2017/0158928 A1 | 6/2017 | Shimoguchi et al. |
| 2018/0010020 A1* | 1/2018 | Furusho .................. C09J 11/04 |
| 2019/0225794 A1* | 7/2019 | Fukuda ................... C08L 63/00 |

FOREIGN PATENT DOCUMENTS

| | | |
|---|---|---|
| CN | 101665475 A | 3/2010 |
| CN | 103131366 A | 6/2013 |
| CN | 109328203 A | 2/2019 |
| DE | 19960411 A1 | 7/2001 |
| EP | 0133281 A2 | 2/1985 |
| EP | 0351025 A2 * | 1/1990 |
| EP | 2897999 B1 | 7/2015 |
| JP | H03143980 A | 6/1991 |
| JP | 2005522572 A | 7/2005 |
| WO | 0224756 A2 | 3/2002 |
| WO | 03022952 A1 | 3/2003 |
| WO | 2008136096 A1 | 11/2008 |

(Continued)

OTHER PUBLICATIONS

International Search Report & Written Opinion PCT/EP2020/056597 Completed: Jul. 30, 2020; dated Sep. 10, 2020 12 Pages.

(Continued)

*Primary Examiner* — Hui H Chin
(74) *Attorney, Agent, or Firm* — Sun Hee Lehmann

(57) ABSTRACT

The invention relates to a composition comprising a sulfone-group containing resin obtainable by reaction of a polyamine containing at least one sulfone-group with a polyepoxide and optionally a hardener, as well as adhesives and coating compositions comprising said compositions having gas-barrier properties, methods for bonding substrates using said adhesives and the thus obtained articles as well as the use of the compositions described herein as adhesive or coatings having gas-barrier properties.

12 Claims, No Drawings

(56) References Cited

FOREIGN PATENT DOCUMENTS

| WO | 2010110076 A1 | 9/2010 | |
|---|---|---|---|
| WO | 2011062160 A1 | 5/2011 | |
| WO | 2011115020 A1 | 9/2011 | |
| WO | 2013097057 A1 | 7/2013 | |
| WO | 2015057444 A1 | 4/2015 | |
| WO | 2015079924 A1 | 6/2015 | |
| WO | 2017104639 A1 | 6/2017 | |
| WO | 2017218500 A1 | 12/2017 | |
| WO | WO-2017221810 A1 * | 12/2017 | ............. B32B 27/12 |

OTHER PUBLICATIONS

Zhang Yuanyuan et al., "Synthesis and Curing Reaction of o—Cresol Formaldehyde Resin," Shandong Chemical Industry, China Academic Journal Electronic Publishing House, 2018, 47, pp. 16, 20, & 22.

He Pei et al., "Synthesis and properties of diglycidyl ether of ethoxylated bisphenol-A," Thermosetting Resin, vol. 28 (4), Jul. 2013, pp. 1-11.

\* cited by examiner

SULFONE-RESIN CONTAINING GAS-BARRIER ADHESIVE

FIELD OF THE INVENTION

The invention relates to a composition comprising a sulfone-group containing resin obtainable by reaction of a polyamine containing at least one sulfone-group with a polyepoxide and optionally a hardener, as well as adhesives and coating compositions comprising said compositions having gas-barrier properties, methods for bonding substrates using said adhesives and the thus obtained articles as well as the use of the compositions described herein as adhesive or coatings having gas-barrier properties.

BACKGROUND OF THE INVENTION

Gas-barrier materials are known to have advantages in the preparation of packaging materials for food, pet food and medical materials and devices, since the exclusion of gases, in particular oxygen, positively affects shelf-life and/or the quality of the filling good. If the laminating adhesive used for laminating the different packaging materials already features the property of a gas barrier, the complexity of the laminate structure can be reduced, as no separate material layers, such as special barrier films or aluminum foil are not needed.

However, to date known gas barrier formulations that are curable lack suitability as adhesives, since they are typically too rigid and brittle and as a result have low adhesive performance and undergo quick ageing, in particular when exposed to humidity and/or elevated temperatures.

In the past, these drawbacks have been addressed by concepts such as admixing phyllosilicates to curable adhesive formulations in order to provide for the desired gas barrier properties. Such approaches are, for example, described in international patent publications WO 2017/218500, WO2013/097057 and WO 02/24756. However, the use of such minerals often results in significant reduction or even loss of adherence. In addition, most clay-type minerals require lengthy processing in order to properly exfoliate the materials.

Other approaches have used highly crystalline polyesters based on aromatic carboxylic acids, as for example described in international patent publication WO 2015/057444. but these suffer from hydrolytic degradation when exposed to humidity leading to bond failure and the release of aromatic acids, such as phthalic acid, which are problematic for toxicological reasons.

Still another approach relies on specific polymer types, such as special polyurethanes or special epoxy resins, such as those described in WO 2015/079924, WO 2011/115020 and EP 2 897 999. Such polymers are often a trade-off between good adhesive performance and gas barrier functionality.

Thus there is still need in the art for alternative solutions that provide laminating adhesives with gas barrier properties that overcome some or all of the above drawbacks of existing formulations.

BRIEF SUMMARY OF THE INVENTION

The inventors have now surprisingly found that this need can be met by a novel type of adhesive based on sulfone resins obtainable by reacting amino-substituted sulfones with epoxides. Formulations containing such resins provide for good adhesive performance while at the same time being excellent in gas barrier properties, in particular oxygen barrier properties.

In a first aspect, the present invention therefore relates to a composition comprising
  (A) a resin component comprising an oligosulfone prepolymer obtained by reacting
    (A1) at least one sulfone-group containing polyamine with
    (A2) at least one polyepoxide; and
  (B) optionally a hardener component, preferably comprising at least one polyisocyanate
    (B1), at least one polyepoxide (B2) and/or at least one polyamine (B3),
    wherein the molar ratio of primary amino groups in component A1 to epoxy groups in component A2 can range from 0.5:1 to 1:0.5.

In another aspect, the invention also encompasses a lamination adhesive with gas barrier properties comprising a composition as described herein, preferably for gluing films and paper.

Also contemplated are coating agents with gas barrier properties comprising the compositions described herein, preferably for coating films and paper.

Another aspect relates to a method for bonding two substrates, comprising applying the composition as described herein or the lamination adhesive of the invention to at least of surface of at least one substrate and contacting the substrate surface(s) with the adhesive applied thereon with the to-be-bonded substrate surface. The substrates may include films, foil or paper. The bonded articles, in particular packaging materials, obtainable by these methods are also included in the scope of the present invention.

Still another aspect is directed to the use of a composition as described herein as an adhesive or coating for film substrates for foodstuff packaging or packaging for medications or medical products or as an adhesive for technical-grade laminations.

Other features and aspects of the subject matter are set forth in greater detail below.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one epoxide" means that at least one type of molecule falling within the definition for an epoxide is used but that also two or more different molecule types falling within this definition can be present, but does not mean that only one molecule of said epoxide is present.

"About", as used herein in relation to a numerical value, means said value±10%, preferably ±5%.

If reference is made herein to a molecular weight, this refers to the average number molecular weight $M_n$, if not explicitly stated otherwise. The number average molecular weight $M_n$ of polymers can be calculated based on end group analysis, if the polymers have hydroxyl end groups, (OH numbers according to DIN EN ISO 4629, NCO content according to EN ISO 11909) or, preferably, can be determined by gel permeation chromatography according to DIN 55672, in particular DIN 55672-1 with THF as the eluent. If not stated otherwise, all given molecular weights are those determined by gel permeation chromatography according to DIN 55672-1 with THF as the eluent. The weight average molecular weight Mw can be determined by GPC, as described for $M_n$.

All percentages given herein in relation to the compositions or formulations relate to weight % relative to the total weight of the respective composition or formula, if not explicitly stated otherwise.

DETAILED DESCRIPTION OF THE INVENTION

The invention is based on the finding that a novel type of sulfone-group containing polymers provides for adhesive compositions, in particular for laminating applications, that at the same time possess good gas barrier properties.

The adhesive compositions of the invention therefore comprise a resin component (A) that comprises, consists essentially of or consists of an oligosulfone prepolymer obtained by reacting at least one sulfone-group containing polyamine (A1) with at least one polyepoxide (A2).

"Consists essentially of", as used herein, means that the respective composition or material comprises at least 50% by weight of said component, preferably at least 60 wt.-%, more preferably at least 70 wt.-%, most preferably at least 80 wt.-%.

The oligosulfone prepolymer may be epoxy- or amine-terminated. "Epoxy", as used herein, relates to the cyclic ether group of the formula:

"Amine", as used herein, relates to the group of the formula —NRR', wherein R and R' can be H or an organic moiety, such as an alkyl group. Preferably, the amine groups are amino groups, i.e. R and R' are both H.

The type of terminal groups of the oligosulfone prepolymer depend on the molar ratio of the amino groups to the epoxy groups in components (A1) and (A2). The molar ratio of primary amino groups in component A1 to epoxy groups in component A2 ranges from 0.5:1 to 1:0.5, preferably from 0.75:1 to 1.25:1, more preferably from 0.9:1 to 1:0.9, especially preferred from 0.95:1 to 1:0.95, most preferred 1:1. It is understood that in case the molar ratio of primary amino groups in component A1 to epoxy groups in component A2 is below 1:1, the resulting polymer will typically be epoxy-terminated, while in case it is greater than 1:1 it will be amino-terminated. Laminating adhesives containing oligosulfone prepolymer prepared with a molar ratio of amino to epoxy within 0.5:1 to 1:0.5 show the desired gas barrier properties. The gas barrier properties can even be improved by amending the ratio closer to 1:1. Additionally, the bonding properties increase at the same time.

In various embodiments, an epoxy groups containing oligosulfone prepolymer is preferred, wherein the epoxy groups can be terminal or along the backbone. Such epoxy groups containing oligosulfone prepolymers can improve the adhesion properties of the laminating adhesive.

The sulfone-group containing polyamine (A1) may be a monomeric or polymeric polyamine. In various embodiments, the polyamine (A1) is a diamine comprising a sulfone group —$SO_2$—. Preferred a monomeric sulfone-group containing polyamines, especially diamines. In various embodiments, the at least one sulfone-group containing polyamine is a diamine of the formula $H_2N$—$R^1$—$(SO_2)$—$R^2$—$NH_2$, wherein $R^1$ and $R^2$ are independently selected from bivalent linear or branched (hetero)alkyl groups, (hetero)aryl groups, (hetero)alicyclic groups or combinations thereof, such as aralkyl and alkylaryl groups. Preferred are alkyl, aryl and cycloalkyl groups and combinations thereof, in particular those with up to 20 carbon atoms, preferably up to 12 carbon atoms, more preferably 1 to 6 carbon atoms.

"(Hetero)alkyl groups", as used herein, refers to alkyl groups that may be linear or branched, substituted or unsubstituted, in particular those with up to 20 carbon atoms, preferably 1 to 12 carbon atoms, more preferably 1-6 carbon atoms, wherein one or more carbon atoms may be replaced by heteroatoms, such as O, S or N, to form the respective heteroalkyl groups. Exemplary alkyl groups include, without limitation, —$(CH_2)_m$—, with m being 1 to 6. If substituted, the substituents are preferably selected from hydroxyl, amino, thiol, carboxyl, acetyl, halogen, $C_{6-14}$ aryl or $C_{5-14}$ cycloaliphatic groups. The alkyl groups may comprise C—C double bonds. Similarly, "(hetero)aryl groups" and "(hetero)alicyclic groups", as used herein, relates to aromatic or aliphatic cyclic groups that may be substituted or unsubstituted, particularly those with up to 20 carbon atoms, preferably 5 to 14 or 6 to 14 carbon atoms, more preferably 6 carbon atoms, wherein one or more carbon atoms may be replaced by heteroatoms, such as O, S or N, to form the respective heteroaryl or heteroalicyclic groups. Exemplary groups include phenyl, cyclohexyl and the like. If substituted, the substituents are preferably selected from hydroxyl, amino, thiol, carboxyl, acetyl, halogen and $C_{1-12}$ alkyl groups. Exemplary groups include benzyl groups. Said groups are bivalent, i.e. are bonded to the amino group and the sulfone group.

In various embodiments, the polyamine (A1) is a compound of formula $R^x$-(-aryl-$R^y$—$NH_2$)$_a$ wherein
$R^x$ is a sulfone group or a sulfone group containing organic moiety, such as —$SO_2$— or —$(CH_2)_n$—$SO_2$—$(CH_2)_n$—, $R^y$ is a alkyl, alkoxy, aryl, aryloxy group and/or not present, preferably $R^y$ is not present, —$(CH_2)_n$— or aryloxy, especially phenoxy, a is 2 or more, preferably 2 or 3, more preferably 2, and each n is 0 or an integer from 1 to 4. Preferably, the polyamine (A1) is a compound of formula $R^x$-(-aryl-$NH_2$)$_a$, $R^x$-(-aryl-$(CH_2)_n$—$NH_2$)$_a$ or $R^x$-(-aryl-O-aryl-$NH_2$)$_a$. Aryl is preferably phenyl.

In various embodiments, the polyamine is a diphenylsulfone, wherein the phenyl groups are substituted with at least one amino group or at least one amino containing group and optionally further another substituent, such as those described above. A particularly component (A1) is 3,3"-Diaminodiphenyl sulfone, 4,4'-diaminodiphenyl sulfone (DDS) or 4,4'-bis(3-aminophenoxy)diphenyl sulfone (BADS), especially preferred 4,4'-diaminodiphenyl sulfone (DDS) or 4,4'-bis(3-aminophenoxy)diphenyl sulfone (BADS).

In various embodiments, the at least one polyepoxide (A2) may very generally be all epoxy compounds which have at least two 1,2-epoxy groups per molecule, preferably two to four 1,2-epoxy groups per molecule. Such polyepoxides may be saturated, unsaturated, cyclic or acyclic, aliphatic, alicyclic, aromatic or heterocyclic polyepoxide compounds. Examples of suitable polyepoxides include polyglycidyl ethers, such as for example those which can be prepared by reacting epichlorohydrin or epibromohydrin with a polyhydroxy compound in the presence of a base.

In one embodiment, the at least one polyepoxide (A2) is glycidyl ether of a polyol. The polyol can be selected from saturated, unsaturated, cyclic or acyclic, aliphatic, alicyclic, aromatic or heterocyclic polyols having at least 2, preferably 2 to 6 hydroxyl groups per molecule. Suitable polyols can be selected from aliphatic diols, like propandiol, butandiol or hexandiol, aromatic diol, like resorcinol, pyrocatechol, hydroquinone, bisphenol A (2,2-bis(4-hydroxyphenyl)propane), bisphenol F (bis(4-hydroxyphenyl)methane), 1,1-bis(4-hydroxyphenyl)isobutane, 4,4-dihydroxybenzophenone, 1,1-bis(4-hydroxyphenyl)ethane and 1,5-hydroxynaphthalene, triols or tetraols, like pentaerytritol or sugars, like sorbitol. Especially preferred are aliphatic diols. These diols lead to improved bonding properties of the resulting laminating adhesive.

In various embodiments, the oligosulfone prepolymer is obtained by reacting a diphenylsulfone, wherein the phenyl groups are substituted with at least one amino group and optionally another substituent, such as those described above, in particular 4,4'-diaminodiphenyl sulfone (DDS), with a diglycidylether of a polyol, especially glycerol diglycidyl ether.

In various embodiments, the oligosulfone prepolymer thus obtained comprises 2 to 10, preferably 3-4 repeating units.

In specific embodiments of the invention, the oligosulfone prepolymer is a compound of Formula (Ia) or (Ib), depending on the molar ratio of components (A1) and (A2):

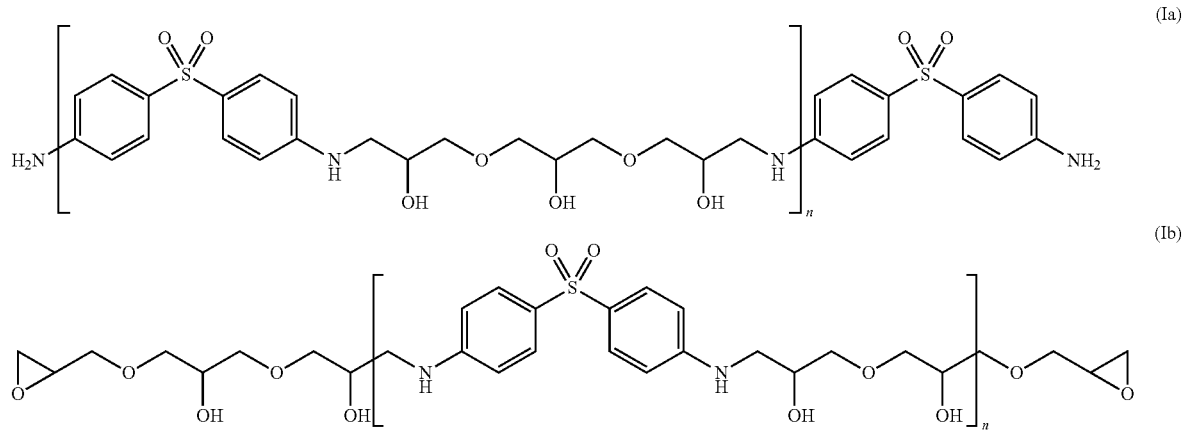

wherein n is 2 to 8, preferably 2 to 6, more preferably 2 to 4.

In various embodiments, the at least one sulfone-group containing polyamine (A1) is reacted with the at least two polyepoxide (A2), selected from the above mentioned, preferably with two monomeric polyepoxides. In another embodiment at least two sulfone-group containing polyamine (A1) is reacted with the at least one polyepoxide (A2), preferably at least two polyepoxides (A2). In another embodiment, the at least one sulfone-group containing polyamine (A1) is reacted with the at least one polyepoxide (A2), containing a polyepoxide with at least 3 1,2-epoxy groups per molecule, preferably 3 to 4 1,2-epoxy groups per molecule. Using a polyepoxide with 3 or more epoxy groups is leading to branched prepolymer, which can increase the performance of the adhesive and its laminates.

To obtain the resin (A), the at least one sulfone-group containing polyamine (A1) is reacted with the at least one polyepoxide (A2) under suitable conditions to form the desired polymer resin, with those being known to the skilled artisan. In various embodiments, these conditions may involve reaction at elevated temperatures, preferably in the range of from about 40 to about 90° C., preferably about 40 to about 70° C., and/or for a time period of 0.5 h to 6 weeks, preferably 1 to 3 weeks, and/or in the presence of an organic solvent, such as methyl ethyl ketone (MEK The polymers of formula Ia and Ib may, for example, be obtained by reacting the educts, DDS and glycerol digylcidyl ether, at 65° C. for 3 weeks in MEK). In one other preferred embodiment, the temperature is in a range of 70 to 90° C. and/or for a time period of 0.5 to 72 h.

In one other preferred embodiment, to obtain the resin (A), the reaction of the components (A1) and (A2) is carried out in the presence of a catalyst. Suitable catalyst are the In another embodiments, it may be preferred that the polyepoxide (A2) is a polyepoxide, preferably a diepoxide, which further comprises at least one hydroxyl group. Such compounds may be obtained by reacting a polyepoxide with a polyhydroxy compound having three or more hydroxyl groups, in particular a diepoxide of a polyol with three or more hydroxyl groups, such as glycerol. Particularly preferred are polyglycidylether, preferably diglycidylether and trigylcidylether, more preferably diglycidylether of polyols, such as glycerol or sugars, like sorbitol, especially polyglycerol polyglycidyl ether, glycerol triglycidyl ether glycerol diglycidyl ether and sorbitol tetraglycidyl ether.

Alternatively, the polyepoxide (A2) may be a polymer or an oligomer based on polyesters, polyamides, poly(meth)acrylates, polyurethanes, polyureas, polyolefins, polycarbonates or aromatic and aliphatic polyepoxides that contains two or more epoxy groups per molecule. If the polyepoxide is a polymer, the epoxy groups may be incorporated directly during the polymer synthesis via epoxy-functional starting compounds. Alternatively, it is possible that in a polymer having double bonds, these are converted to epoxy groups. Another possibility is to react polymers having OH groups or isocyanate groups as the base polymer with low-molecular epoxide compounds, which additionally have a group that is reactive with the OH group or the isocyanate group. Such reaction processes or polymer-analogous reactions are familiar to those skilled in the art. Especially preferred is a polymeric polyepoxide based on a polyether polyol. The polyether polyol can be selected from polyethylene glycol, polypropylene glycol or polyglycerol. Especially preferred is polyglycerol polyglycidyl ether.

In one embodiment, it is preferred that the polyepoxide is a monomeric compound.

known catalysts for the epoxy amine reaction. Preferred catalysts are selected from organic bases, preferably containing nitrogen, especially containing at least one tertiary nitrogen atom and/or an imine nitrogen atom. The term "tertiary", as used herein, indicates that three organic residues are covalently bonded, via single bonds, to the nitrogen atom. The term "imine", as used herein, relates to the known class of substances and indicates that the nitrogen atom has a covalent double bond to an organic residue and a covalent single bond to a further organic residue. Preferred tertiary amine bases or the imine bases are cyclic compounds which contain at least two nitrogen atoms. In different embodiments, the bases are for example imidazole derivatives, such as for example 1-alkyl-imidazole or 2,4-dialkyl imidazole, amidine derivatives, such as 1,8-diazabicyclo[5.4.0]undec-7-ene (DBU), or bicyclic tertiary amines, such as 1,4-diazabicyclo[2.2.2]octane (DABCO; triethylene diamine). Especially preferred as catalyst are 1,8-diazabicyclo[5.4.0]undec-7-ene (DBU) or 1,5-Diazabicyclo[4.3.0]non-5-ene (DBN), especially 1,8-diazabicyclo[5.4.0]undec-7-ene (DBU).

In one embodiment, both components A1 and A2 are flowable. The viscosity may be less than 20,000 mPas (25° C., ISO 2555, Brookfield LVT). In another embodiment, organic solvents are present in at least one component, so that these may also be liquid components.

While not necessary for curing, in various embodiments, the compositions of the inventions may comprise a hardener component, the hardener component (B) preferably comprising, consisting essentially of or consisting of at least one polyisocyanate (B1), at least one polyepoxide (B2) and/or at least one polyamine (B3).

The type of hardener used depends on whether the resin (A) is epoxy- or amino-terminated. If the resin (A) is amino-terminated, polyisocyanate and polyepoxide hardeners are preferred. If the resin is epoxy-terminated, polyisocyanate and polyamine hardeners are preferred, particularly polyisocyanate hardeners. Using polyisocyanate hardeners in the compositions of the invention can further increase the gas barrier properties.

The polyisocyanates (B1) used as hardeners may be selected from monomeric or oligomeric polyisocyanates and NCO-terminated (pre)polymers, with the former being preferred. Any suitable compound, which contains two or more isocyanate groups, may be used in the hardeners of this invention. Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenyl sulphone-4,4'-diisocyanate, 2,4-tolylene diisocyanate, dichlorohexamethylene diisocyanate, furfurylidene diisocyanate, 1-chlorobenzene-2,4-diisocyanate, 4,4',4''-triisocyanatotriphenylmethane, 1,3,5-triisocyanato-benzene, 2,4,6-triisocyanato-toluene, 4,4'-dimethyldiphenyl-methane-2,2',5,5'-tetratetraisocyanate, and the like. While such compounds are commercially available, methods for synthesizing such compounds are well known in the art. Preferred isocyanate-containing compounds are methylenebisphenyldiisocyanate (MDI) and its polymeric analog as described in "The Polyurethanes Book", D. Randall and S. Lee, eds., John Wiley & Sons, 2002, page 84, isophoronediisocyanate (IPDI), hydrogenated methylenebisphenyldiisocyanate (HMDI) and toluene diisocyanate (TDI), as well as oligomeric adducts thereof, such as the reaction products of trimethylolpropane and TDI, which are commercially available from Covestro under the trade name Desmodur® L-75.

In various embodiments, the component B1 is a di- or triisocyanate and/or an aromatic polyisocyanate, preferably a reaction product of an aromatic diisocyanate and a polyol, more preferably of TDI and trimethylolpropane with three isocyanate groups.

The polyepoxides (B2) and polyamines (B3) may similarly be selected from monomeric, oligomeric or polymeric compounds. As polyepoxides (B2) the same compounds described herein as component A2 are suitable. In various embodiments, component B2 is thus selected from monomeric epoxides, preferably diepoxides, more preferably a diglycidyl ether of a polyhydroxy compound, most preferably a diglycidyl ether of a polyol, or oligomeric or polymeric epoxides selected from epoxy resins and prepolymers selected from the group consisting of poly(meth)acrylates, polyolefins, polybutadienes, polyesters, polyamides, polyurethanes, and aliphatic and/or aromatic polyepoxide resins containing at least two epoxy groups.

In some embodiments, the at least one polyamine (B3) is selected from monomeric polyamines, preferably diamines, more preferably aliphatic diamines, or oligomeric or polymeric polyamines selected from polyamine resins and prepolymers containing primary amine groups.

The hardeners may be used in amounts suitable to achieve the desired curability. If hardeners are used, the composition is typically a two-component composition, where the two components are mixed shortly before or during application.

The compositions described herein may be used as such as adhesive compositions or, more preferably, to produce such adhesive compositions, in particular adhesives for laminating applications, such as packaging, for example for gluing films and paper. Accordingly, the invention features adhesive compositions, in particular laminating/lamination adhesives, comprising the compositions described herein. In these adhesives, it may be advantageous if additional ingredients are added such as, for example, solvents, plasticizers, catalysts, stabilizers, adhesion promoters, pigments and/or fillers.

In one embodiment, the adhesive composition therefore contains at least one tackifying resin. In principle, all resins which are compatible and which form a homogeneous mixture may be used. For example, aromatic, aliphatic or cycloaliphatic hydrocarbon resins may be used, as well as modified or hydrogenated versions thereof. The resin may be used in an amount of 0 to 50% by weight, preferably up to 20% by weight, based on the composition.

Additional soluble polymers may also be contained in the adhesive composition, such as polymers having gas barrier properties or flavoring barrier properties. Examples of such include polysaccharides, such as cellulose ethers or esters.

In addition, plasticizers may also be present, such as white oils, naphthenic mineral oils, paraffinic hydrocarbon oils, adipates, benzoate esters, vegetable or animal oils, and derivatives thereof. In particular, plasticizers that are safe for use in foods are suitable, for example, citric acid esters or short-chain triglycerides.

Phenols, high molecular weight sterically hindered phenols, polyfunctional phenols, and sulfur- and phosphorus-containing phenols or amines are suitable as stabilizers or antioxidants that may optionally be used.

It is also possible to add silane compounds as adhesion promoters to the composition. Adhesion promoters that can be used include the known organofunctional silanes, such as (meth)acryloxy-functional, epoxy-functional, amine-functional silanes or nonreactively substituted silanes. In one preferred embodiment, 0.1 to 5% by weight of these silanes is added to the adhesive. Depending on the choice of silane, it is advantageous to mix the silane into only one component, i.e. either the resin or the hardener. It is thus possible to prevent a premature reaction and a reduction in storage stability.

An adhesive composition may also contain catalysts as an optional additional additive. The catalysts used may include all the known compounds capable of catalyzing the reaction of amino/epoxy groups and isocyanate/epoxy/amino/hydroxyl groups. Examples include metal compounds such as titanates, bismuth compounds, tin carboxylates or zirconium chelates, or amine compounds or their salts with carboxylic acids, such as nonvolatile alkylamines, amino alkanols, morpholine and derivatives thereof, polyamines such as triethylenetetramine, guanidine or 1,8-diazabicyclo[5.4.0]undec-7-ene (DBU). The catalyst may be used in an amount of 0 to approximately 5% by weight, based on the total weight of the adhesive, preferably 0.1 to 1% by weight catalyst.

A special embodiment of the invention may also contain pigments or fillers in the compositions. These are finely divided pigments having a particle size<5 for example. One embodiment of the invention involves flaked pigments which may be dispersed in a component of the binder. Another procedure uses nanoparticles, which usually have a particle size<500 nm, in particular <100 nm. Those skilled in the art are familiar with such pigments or fillers, and can select these according to customary considerations and incorporate them into one or both binder components by using known methods.

In one embodiment, the adhesive composition may also contain solvents. These are the customary solvents which can evaporate at temperatures up to 120° C. The solvents may be selected from the group of aliphatic hydrocarbons, araliphatic hydrocarbons, ketones, in particular $C_1$-$C_4$ alcohols, ketones or water. In one embodiment, the two-component composition contains such a solvent.

It is possible to produce (two-component) adhesives or two-component coating agents from the composition together with the additives.

Since the adhesives are suitable in particular for coating large surface areas, they should have a low viscosity at an application temperature of approximately 20° to 90° C. The viscosity of the adhesives according to the invention, measured after mixing the components, should be between 200 and 5000 mPas at the application temperature, preferably 300 to 3000 mPas, in particular at 20° to 60° C. (Brookfield viscosimeter LVT according to EN ISO 2555).

The known auxiliary substances and additives may be added to the component A or to component B in the two-component adhesives, provided that they do not react with the additives. Solvents may also be contained, and in preferred embodiments solvents are used in the compositions.

An adhesive according to the invention may be used in particular as a lamination adhesive. The adhesives are applied in a thin layer to a substrate, such as a film. Immediately thereafter, any solvents that are optionally present should be evaporated. A second substrate, such as a second film, is subsequently contacted with/applied to the adhesive layer and optionally the obtained laminate pressed with pressure.

The invention therefore also comprises methods for bonding two substrates, comprising applying the composition or the lamination adhesive according to the invention to at least one surface of at least one substrate and contacting the substrate surface(s) with the adhesive with the to-be-bonded substrate surface.

Known flexible films may be used as substrates, i.e. film materials, for producing multilayer films. These are substrates of thermoplastic materials in film form, for example, polyolefins such as polyethylene (PE) or polypropylene (PP, CPP, OPP), polyvinyl chloride (PVC), polystyrene (PS), polyesters such as PET, polyamide, organic polymers such as cellophane; in addition, metallized films, films coated with $SiO_2$ or $Al_2O_3$, metal foils or paper are also possible as substrates. The film materials may also be modified, for example by modifying the polymers with functional groups, or additional components, for example pigments, dyes or foamed layers, may also be contained in the film. Colored, printed, colorless or transparent films may also be used.

Another embodiment of the invention uses the compositions for (two-component) coating agents. These coating agents may in principle contain the same ingredients as those described for the lamination adhesives. In making a selection, however, it is important to be sure that, after crosslinking, the coating agents do have a smooth, non-tacky surface. There should be good adhesion only to the substrate to which the coating agent is applied in liquid form. Those skilled in the art are familiar with such ingredients, which should be used only in a small amount by weight or should be avoided in the production of non-tacky surfaces.

The subject of the invention likewise relates to bonded articles obtained by using the adhesives of the invention for bonding two substrates. In various embodiments, this bonded article is a multilayer film which is bonded using a lamination adhesive comprising a composition according to the invention; the known plastic films may be used as substrates. A continuous layer is produced on this film using an adhesive according to the invention, and is bonded to a second film of the same or different type immediately after application. In addition to the two-layer films, it is also possible to produce a multilayer film with additional work steps. One embodiment according to the invention works with transparent films, for which it is advantageous if the adhesive according to the invention is likewise transparent and is not discolored. In principle, other non-plastic films, such as paper or metal foils, for example, may also be used in multilayer films.

The adhesive according to the invention exhibits good adhesion between the different layers. It does not exhibit bubbles or defects in the adhesive layer. The resulting composite substrates are flexible. Cracks and delamination are prevented, even in the possible additional production steps as packaging.

The subject matter of the invention further relates to the use of the composition according to the invention to produce coatings on flexible composite substrates. The additives and auxiliary substances stated above may be contained in the coating agent. The coating agents are liquid, or may be applied in flowable form by heating to 90° C. These coatings are flexible after crosslinking, and therefore may be used in particular for flexible multilayer films. In one preferred embodiment, the coating agent according to the invention is applied at an application temperature between 20° and 60° C.

After crosslinking, layers that are not tacky at the surface are obtained. Such films may then be further processed in a known manner either being applied as additional lamination layers or being finished.

The composite films produced according to the invention have high flexibility. They may be transparent, i.e., containing only nanoparticles as fillers, or containing no fillers or only small amounts of customary fillers, so that the adhesive layer does not have an extremely cloudy appearance in the composite. However, these may also be colored or pigmented layers.

The layers according to the invention have the particularly advantageous property of providing a gas barrier effect. It has been shown that compared to conventionally adhesively bonded films, the materials of the invention exhibit improved barrier effects against diffusion of gases such as oxygen or water vapor.

The compositions according to the invention may be further processed to form two-component coating agents or two-component adhesives in a simple manner. Composite films having high barrier properties are obtained when these adhesives or coating agents are used on film substrates. The barrier properties may be based on various ingredients; for example, the diffusion of oxygen may be reduced. Another embodiment reduces the diffusion of water. In addition, it is possible to reduce the diffusion of flavoring substances from a package or into a package, for example.

Adhesion to the various substrate materials is good. No separation between adhesively bonded surfaces is observed, even with mechanical load on the composite materials, for example, the adhesively bonded films. For example, packaging can be produced from the composite materials according to the invention. Due to the barrier effect, such packaging is suitable for sensitive items such as foodstuffs or pharmaceutical goods. Another field of application is technical lamination adhesives, for example, adhesive bonding for flexible circuits or similar objects.

The invention thus also relates to the use of the compositions described herein as an adhesive or coating for film substrates for foodstuff packaging or packaging for medications or medical products or as an adhesive for technical-grade laminations.

It is understood that all embodiments disclosed herein in relation to the compositions of the invention are similarly applicable to the adhesives and coatings, the methods, bonded articles and uses, insofar applicable, and vice versa.

The following examples are given to illustrate the present invention. Because these examples are given for illustrative purposes only, the invention should not be deemed limited thereto.

EXAMPLES

Example 1

Laminates on PET (12 μm) and crystalline PP (cPP; 40 μm) were prepared. After dispensing the solvent-based adhesive formulation onto the PET film (dry: 3.5 g/m$^2$), the solvent was dried off and subsequently the second film (cPP) laminated on top of it. After allowing the adhesive to cure. Oxygen barrier (OTR; @75% relative humidity in cm$^3$/(m$^2$·24 h-ND) measured in duplicate) and peel strength (after 3 weeks in N/15 mm) were measured. As control laminates with a standard laminating adhesive were prepared under the same conditions.

The following adhesive compositions have been tested:

Base polymer: Polymer of Formula Ia with n~3

Hardener: none, adduct of TDI and trimethylolpropane (Desmodur® L-75; 6.1 wt.-% relative to the adhesive composition and based on solid content), glycerol digylcidyl ether (GDGE) (11.3 and 20.3 wt.-% relative to the adhesive composition)

TABLE 1

| | Base polymer | Hardener | Peel strength [N/15 mm] | OTR [cm$^3$/(d m$^2$)] |
|---|---|---|---|---|
| 1 | Formula Ia | None | 0.5 | 22.8 |
| 2 | Formula Ia | 6.1% Desmodur L-75 | 0.2 | 19.2 |
| 3 | Formula Ia | 11.3% GDGE | 0.9 | 19.4 |
| 4 | Formula Ia | 20.3% GDGE | 1.0 | 25.1 |
| Control | | | | 100-120 |

The results in table 1 show that in all cases, even without hardener, a significant oxygen barrier can be achieved, while retaining significant peel strength.

The experiment was repeated with different amounts of isocyanate hardener (Desmodur® L-75) and two different base polymers. Peel strength was tested after 1 week (1 w) and 5 weeks (5 w)

The following adhesive compositions have been tested:

Base polymer: Polymer of Formula Ia with n~3 and Formula Ib with n~3

Hardener: adduct of TDI and trimethylolpropane (Desmodur® L-75; wt.-% relative to the adhesive composition and based on solid content)

TABLE 2

| | Base polymer | Hardener | Peel strength after 1 w [N/15 mm] | Peel strength after 5 w [N/15 mm] | OTR [cm$^3$/(d m$^2$)] |
|---|---|---|---|---|---|
| 5 | Formula Ia | 4.6 wt.-% | 0.4 | 0.6 | 19.9 |
| 6 | Formula Ia | 8.9 wt.-% | 0.2 | 0.5 | 20.5 |
| 7 | Formula Ia | 16.3 wt.-% | 0.1 | 0.1 | 20.6 |
| 8 | Formula Ib | 4.6 wt.-% | 0.2 | 1.8 | 24.8 |
| 9 | Formula Ib | 8.9 wt.-% | 0.1 | 1.4 | 24.7 |
| 10 | Formula Ib | 16.3 wt.-% | 0.3 | 1.5 | 26.4 |

Again, significant oxygen barrier properties were found and peel strength was even higher than in the first experiment. It can also be seen that bond strength increases over time.

In the next round of experiments, the base polymer of formula Ib (n~3) was combined with the isocyanate hardener (Desmodur® L-75; formulation 11) and a linear prepolymeric hardener (Liofol LA 7777, Henkel Corp.; formulations 12-14). Peel strength was measured after 7 days and 28 days. OTR was measured after 16 hours and 35 hours.

TABLE 3

| Base polymer | Hardener | Peel strength 7 d [N/15 mm] | Peel strength 28 d [N/15 mm] | OTR 16 h [cm³/(dm²)] | OTR 35 h [cm³/(dm²)] |
| --- | --- | --- | --- | --- | --- |
| 11 Formula Ib | 4.6 wt.-% | 0.1 | 1.1 | 27.7 | 22.9 |
| 12 Formula Ib | 7.5 wt.-% | 0.4 | 1.1 | 40.8 | 34.0 |
| 13 Formula Ib | 14.2 wt.-% | 0.2 | 1.0 | 46.4 | 34.8 |
| 14 Formula Ib | 24.7 wt.-% | 0.1 | 0.9 | — | 61.4 |

Significant oxygen barrier properties could be demonstrated. OTR as well as peel strength increased over time. As oxygen barrier properties were measured at relatively high humidity and still a significant barrier effect can be seen, this means that the cured adhesive is relatively insensitive to moisture.

Additionally, adhesive compositions have been tested containing as base polymer a reaction product of glycerol di-glycidyl ether or glycerol tri-glycidyl ether and DDS in molar ratio of amino to epoxy groups of 1:1 together an adduct of TDI and trimethylolpropane as hardener (Desmodur® L-75; wt.-% relative to the adhesive composition and based on solid content).

TABLE 4

| Base polymer | Hardener | Peel strength 14d [N/15 mm] | OTR [cm³/(d m²)] |
| --- | --- | --- | --- |
| 15 Reaction product of glycerol di-glycidyl ether + DDS (1:1) | 4.6 wt.-% | 3.8 | 25.4 |
| 16 Reaction product of glycerol tri-glycidyl ether + DDS (1:1) | 5.1 wt.-% | 2.5 | 49 |
| 17 Reaction product of glycerol tri-glycidyl ether + DDS (1:1) | 9.7 wt.-% | 2.4 | 45 |

As a comparison example, an adhesive composition has been tested containing as base polymer a reaction product of glycerol diglycidyl ether and DDS in molar ratio of epoxy to amino groups 1:2.5. By using such an adhesive composition the laminate showed no bonding, directly of lamination and several days later, leading to a peel strength of 0 N/15 mm. The measured OTR is 84.2 cm³/(d m²), which shows that such adhesive compositions lead to laminates with poor gas barrier properties.

Measurement Methods:

Peel Strength:

The peel strength has been measured on 15 mm wide stripes of the laminates by a tensile testing machine (e.g. from Instron or Zwick) with a force of 0 to 20 N. The laminate stripes were partially separated on one side, mounted in the tensile testing machine and pulled apart in a 90° angel with 100 mm/min. The mentioned result is an average based on three measurements.

Oxygen Permeability (Oxygen Transmission Rate (OTR)):

OX-TRAN 2/21 H measuring devices from MOCON were used to determine the oxygen permeability. The test cell of the measuring instruments consists of two halves. The film was mounted between the two half-cells. Oxygen as the test gas was passed through the outer half-cell. Carrier gas, a mixture of 95% nitrogen and 5% hydrogen (essentially forming gas) flowed through the inner half-cell. Oxygen penetrating through the film is picked up by the carrier gas and conveyed to the detector. The oxygen sensor generates an electric current in the presence of oxygen, this current being proportional to the amount of oxygen arriving.

What is claimed is:

1. A composition comprising:
   (A) a resin component comprising an oligosulfone prepolymer obtained by reacting
      (A1) at least one sulfone-group containing polyamine with
      (A2) at least one polyepoxide,
   wherein the oligosulfone prepolymer is a compound of Formula (Ia) or (Ib)

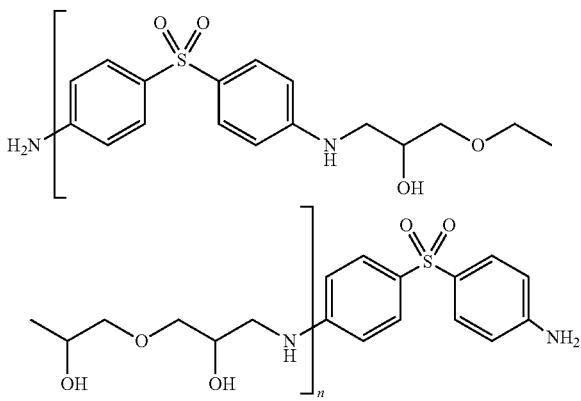

(Ia)

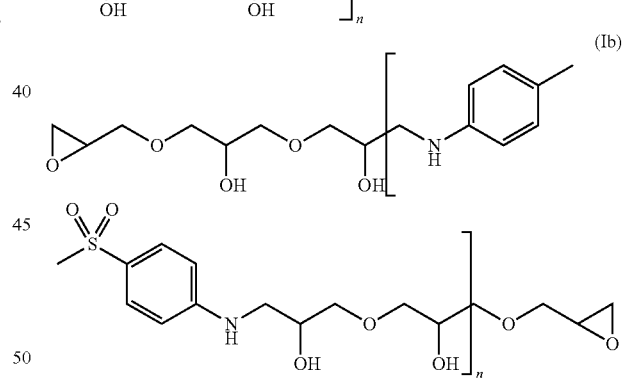

(Ib)

wherein n is 2 to 6; and
   (B) optionally a hardener component comprising one or more of a polyisocyanate
      (B1), polyepoxide (B2), and polyamine (B3),
   wherein the molar ratio of primary amino groups in component A1 to epoxy groups in component A2 ranges from 0.5:1 to 1:0.5.

2. The composition according to claim 1, wherein components (A1) and (A2) are mixed in a molar ratio of primary amino groups in component A1 to epoxy groups in component A2 of 0.75:1 to 1.25:1.

3. The composition according to claim 1, wherein the at least one sulfone-group containing polyamine has a formula of $H_2N$—$R^1$—$(SO_2)$—$R^2$—$NH_2$, wherein $R^1$ and $R^2$ are independently selected from a bivalent linear or branched (hetero)alkyl group, (hetero)aryl group, (hetero)alicyclic group or combinations thereof.

4. The composition according to claim 1, wherein the at least one polyepoxide (A2) is a diglycidyl ether of a polyol.

5. The composition according to claim 4, wherein the polyepoxide further comprises at least one hydroxyl group.

6. The composition according to claim 1, wherein the (A) component comprising an oligosulfone prepolymer resin is further prepared
   (i) at about 40 to about 90° C., and/or
   (ii) for 0.5 hours to 6 weeks, and/or
   (iii) in an organic solvent.

7. The composition according to claim 1, wherein
   (1) the at least one polyisocyanate (B1) is a reaction product of toluene diisocyanate and trimethylolpropane; and/or
   (2) the at least one polyepoxide (B2) is selected from
      (i) diglycidyl ether of a polyol, or
      (ii) epoxy resins and prepolymers selected from the group consisting of poly(meth)acrylates, polyolefins, polybutadienes, polyesters, polyamides, polyurethanes, and aliphatic and/or aromatic polyepoxide resins containing epoxy groups; and/or
   (3) the at least one polyamine (B3) is selected from
      (i) aliphatic diamines, or
      (ii) prepolymers containing primary amine groups.

8. The composition according to claim 1, wherein the composition has an oxygen barrier functionality.

9. The composition according to claim 1, wherein the composition further comprises an organic solvent.

10. A lamination adhesive comprising a composition according to claim 1.

11. A method for bonding two substrates, comprising applying the composition according to claim 1 to at least one surface of at least one substrate and contacting the composition with at least one surface of a second substrate.

12. The method of claim 11, wherein the at least one substrate and the second substrate is independently selected from a paper, plastic film or metal foil.

* * * * *